Aug. 20, 1968 G. C. KOHL 3,397,699
RETAINING CATHETER HAVING RESILIENTLY BIASED WING FLANGES
Filed May 5, 1966 2 Sheets-Sheet 1
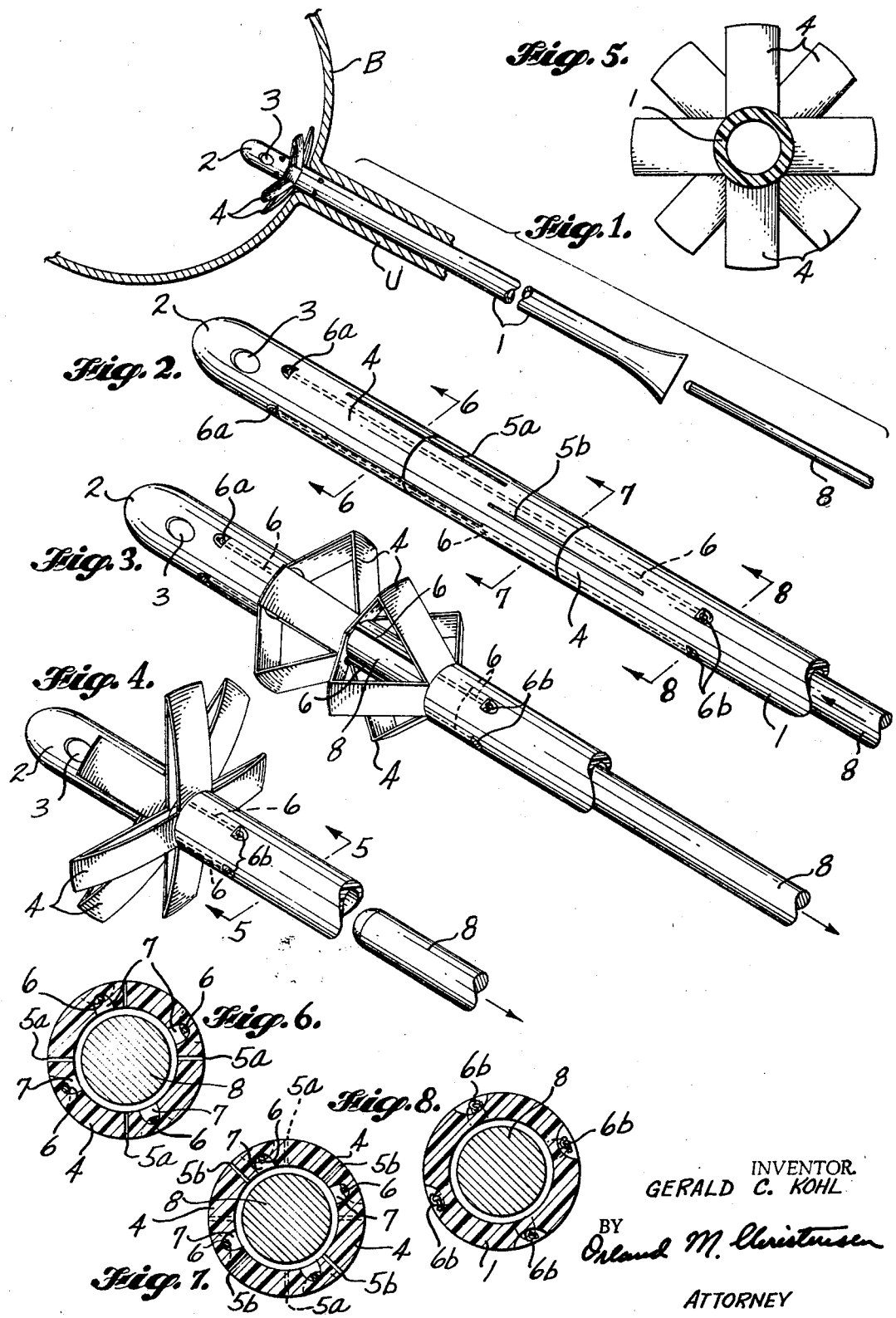
INVENTOR.
GERALD C. KOHL
BY Orland M. Christensen
ATTORNEY Aug. 20, 1968 G. C. KOHL 3,397,699
RETAINING CATHETER HAVING RESILIENTLY BIASED WING FLANGES
Filed May 5, 1966 2 Sheets-Sheet 2
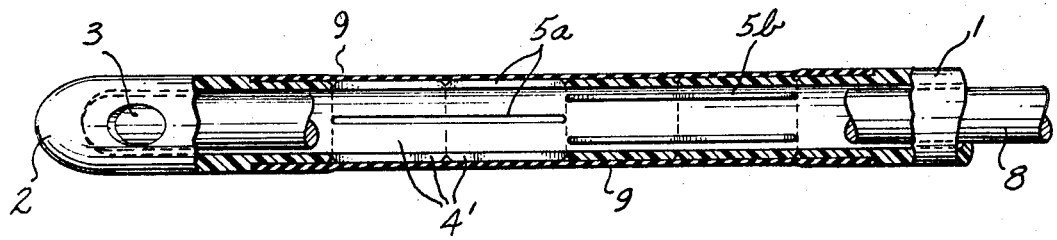
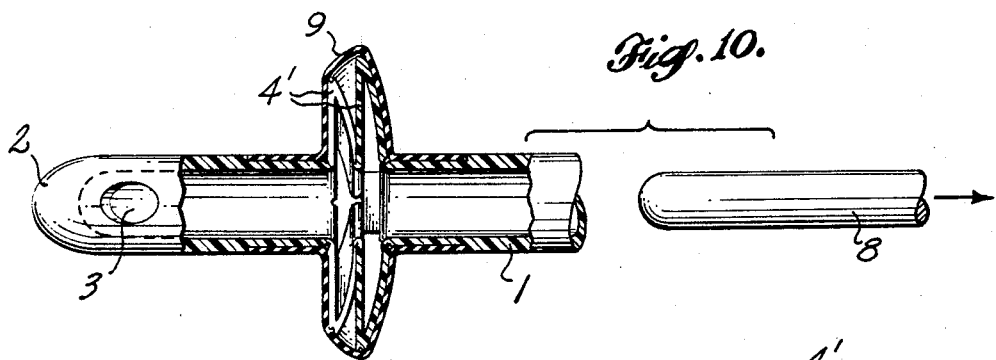
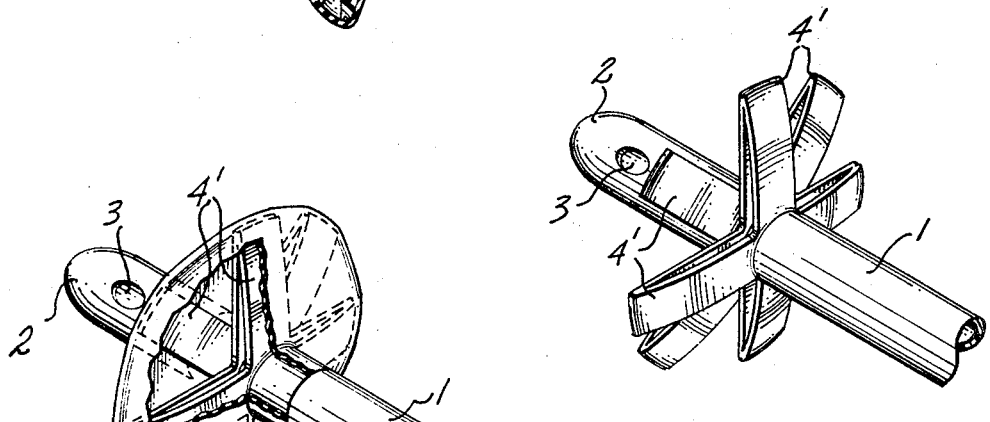
INVENTOR.
GERALD C. KOHL
BY
ATTORNEYS

United States Patent Office 3,397,699
Patented Aug. 20, 1968

3,397,699
RETAINING CATHETER HAVING RESILIENTLY BIASED WING FLANGES
Gerald C. Kohl, 1106 S. 4th St., Tacoma, Wash. 98405
Continuation-in-part of application Ser. No. 519,514, Jan. 10, 1966. This application May 5, 1966, Ser. No. 554,260
10 Claims. (Cl. 128—349)

ABSTRACT OF THE DISCLOSURE

A flexible thin-walled catheter formed with an occluded distal end and an open proximal end. A lateral aperture is defined by the tube walls of the catheter adjacent to the distal end. A plurality of longitudinal slits in a zone adjacent to but proximally of the aperture define a plurality of foldable wings. An elastic cord is secured to the tube at both ends of the wings to provide a biasing force tending to radially extend the wings to provide a means for retaining the catheter in place. During insertion of the catheter into the body cavity being drained or removal therefrom a stylet is inserted through the opened end of the tube until it contacts the occluded end to stretch the tube to such an extent that the biasing force of the cord is overcome and the foldable wings are radially drawn back into aligment with the body of the tube. The use of the flexible resilient cord to flex the wings permits the catheter to be made of flexible material having little columnar strength to provide a more comfortable and easily curved catheter.

---

This is a continuation-in-part of my application Ser. No. 519,514, now abandoned, filed Jan. 10, 1966.

The invention of this application relates to a catheter or similar instrument, used for drainage of body cavities (i.e. organ interiors, passages, spaces, etc.), or it can be used for the placement within such cavities of a medicament. In particular it relates to a catheter provided with means whereby it is automatically self-retaining following insertion, yet is readily releasable for withdrawal whenever that is desired.

The term "catheter" is commonly used to identify a tubular instrument that is inserted through the urethra into the bladder, to facilitate drainage of the bladder, and the instrument of this invention has been designed for that specific purpose, but it is also usable for insertion into various body cavities, naturally or surgically opened, and in this specification and claims the term "catheter" will be understood as intended thus broadly, unless the context clearly indicates the contrary.

Prior catheters have lacked satisfactory means for retaining them, after insertion, or the retaining means have been such as to produce appreciable discomfort, or to require that the catheter be stiff enough to transmit a longitudinal or columnar force of compression. In the latter case the catheter by reason of its inherent stiffness is uncomfortable, especially if it must remain in place for somewhat extended periods, and that in essence is the reason for providing retention means. If the necessary physical force required to dispose or to maintain the retention means in retaining position, and hence to hold the catheter in place, is derived from the stiffness of the catheter wall material, such that columnar stiffness of the catheter tube is required to transmit distally applied forces that act to disposed or to retain the proximally disposed retention means in retaining position, after the catheter has been inserted, the catheter becomes unduly stiff to accommodate bodily imposed curvature with comfort. Some prior devices have presented this type of difficulty. Others have lacked in reliability of the retention means or in the convenience with which such a means may be extended and retracted for installation, insertion and removal of the catheter. Moreover, certain prior catheter retention means when expanded, tended to bear upon an insufficient tissue area, thereby tending to produce necrosis or traumatization of tissues in these areas. Still other catheters incorporate rods, cords or the like which remain within the lumen, but which are necessary to effect retention. These block drainage to an undesirable extent.

It is a primary object of this invention to provide a catheter which is so formed as to be inserted with a minimum of difficulty or discomfort, which incorporates retention means that are biased, inherently or by applied elastic means, to expand into retaining position following insertion, which catheter and its retention means are such as to cause the minimum of discomfort, even during rather extended periods of use, which affords free and clear drainage during such periods, and which is easily removable with a minimum of discomfort. More specifically, it is the primary object to provide a catheter that need be only thick enough or strong enough to resist forces of extension between its distal and proximal ends (but not forces of compresison), during insertion and removal, which forces are supplied by a separate stylet that extends and stiffens the catheter sufficiently to facilitate insertion or removal, but which is wholly withdrawn after insertion and until removal, and therefore leaves the lumen wholly and freely open for drainage. Upon withdrawal of the stylet, following insertion of the catheter, the elastic forces are free to act upon the retaining means, and the latter automatically move from their stressed position for insertion into their unstressed retaining position, wherein they remain until reintroduction of the stylet to oppose such elastic forces.

In addition, it is an important object of the invention to provide a flexible catheter with retention means in the form of extendable and retractable wings which are essentially part of the wall material and which are subject to inherent or to applied elastic forces, whereby these wings are automatically expanded upon insertion of the catheter without relying upon resilient stiffness of the wall material to effect such result, said wings being so related as to define an appreciable number of retention "flanges" that are generally coplanar when expanded, and arranged in a circle so as to spread their bearing upon the interior wall of the bladder to the greatest extent possible, thereby distributing the bearing pressure of the retention means over a wide area surrounding the cavity orifice.

In addition, the wings may be shrouded by a thin, flexible hood, to spread the retentive bearing further, and to eliminate any abrupt edge that might bear on sensitive tissue. The use of such a hood is optional.

It is also an object to provide a catheter having the above advantages that is relatively easy to manufacture, and that can be made sufficiently inexpensively that it can be disposable after use if desired. Nevertheless, if not intended to be disposable, it can be made in a form and of material that is readily sterilizable and reusable.

With these and other objects in mind, such as will appear in greater detail hereinafter, this invention comprises the novel catheter and in combination therewith the means for inserting and withdrawing the same, but as is shown in representative forms in the accompanying drawings, and as will be described and claimed in this specification.

FIGURE 1 is an elevational view of the catheter as installed, with the inserting stylet just withdrawn; the walls of the bladder and of the urethra where shown are in section.

FIGURE 2 is a perspective view of the distal end of the catheter, as prepared for insertion or withdrawal, FIGURE 3 is a like view but illustrating the position of parts when the stylet is but partially installed or withdrawn, and FIGURE 4 is a like view showing the position of parts after withdrawal of the stylet.

FIGURE 5 is a cross-sectional view taken along the line 5—5 of FIGURE 4, illustrating the broad bearing afforded by the outspread wings.

FIGURES 6, 7, and 8 are cross-sectional views taken respectively at the lines 6—6, 7—7, and 8—8 of FIGURE 2.

FIGURE 9 is an elevational view, largely in axial section, of a modified form of the catheter, prepared for insertion, and FIGURE 10 is a like vew of the catheter in the unstressed position it assumes when installed.

FIGURE 11 is a perspective view of the catheter's distal end, in its unstressed position, and FIGURE 12 is a like view, with an added element, broken away.

The catheter is shown in FIGURES 1 to 8 in a simple form. It includes a tube 1 of suitable length, cross-sectional diameter and material, occluded at its distal end, at 2, but open at its proximal end. At its distal end it has one or more lateral apertures 3, for communication through its walls. proximally of these apertures, but adjacent the apertures, the walls of the tube are slitted longitudinally and scored or indented at desired fold lines so as to form wings 4 that are capable of folding or that are inherently foldable outwardly, as in FIGURES 1, 4, and 5, or that can be drawn inwardly, as in FIGURES 2, 6, 7, and 8, or as in FIGURES 10, 11 and 12, so as to constitute, when retracted, in effect a smooth continuation of the exterior walls of the tube.

The tube 1 may be made, for instance, of a flexible plastic material, or of rubber, whereby the wings 4, being flexible, can be extended outwardly by a resilient force acting longitudinally of the tube to draw the apertured distal end 2 towards the proximal end, beyond the base of the wings. The wings are defined by slits 5a or 5b or both, directed longitudinally of the tube, and distributed circumferentially about the tube. The longitudinally acting force can be supplied, for example, by resiliently elastic rubber elements 6, one or more for each wing, spanning the zone or zones of the wings 4, with their ends anchored at 6a and 6b in the walls of the tube, beyond the distal and proximal ends, respectively, of the wings, and biased to draw their ends strongly together. Preferably the elements 6 are located at the interior wall of the tube, so that they do not contact the interior wall of the urethra U, and the interior wall of each wing may be longitudinally channeled, at 7, so that the elements 6 will not interfere with the stylet 8, to be described later, that is used during insertion or withdrawal of the catheter.

The tube 1 is shown as slit at 5a and 5b, in two adjacent zones, with the slits in the two zones staggered circumferentially relative to each other, to define in this example eight wings which, when folded outwardly by the force of the resilient members 6 lie generally coplanar, as seen in FIGURES 1 and 4, and so spread the reaction to withdrawal over the greatest possible area of the bladder wall B.

The catheter tube is prepared for insertion through the urethra U by inserting through its proximal end a relatively stiff stylet 8, until the distal end thereof engages the occluded end 2 of the tube. Sufficient force is then exerted on that end 2, through the columnar pressure of the stylet, to push the end 2 as far as possible from the proximal end thereof. This stretches the elastic cord elements 6 and the wings 4 unfold, from the position of FIGURE 4 to that of FIGURE 2. Now the wings are in effect a smooth continuation of the tubular portion of the catheter. While holding parts in this position, the catheter is inserted in the usual way through the urethra and into the bladder to a sufficient distance that all the wings clear the interior wall thereof. Now the catheter's distal end is held against inward movement while the stylet is gradually withdrawn, thereby allowing the wings to fold into outwardly projecting position and held there by contraction of elastic cords 6. Finally the stylet is fully withdrawn. The outspread wings will serve effectively and cooperatively as a stop, bearing upon the bladder wall surrounding the urethra, reliably yet non-injuriously holding the catheter in position. Moreover, the tube is wholly open and free of obstruction, and drainage by way of the hole or holes 3 and the tube 1 is unrestricted. When the catheter is to be withdrawn the stylet is reinserted and the occluded end 2 is urged away from the proximal end, again stretching the resiliently elastic elements 6 and drawing the wings into the cross-section of the tube 1 as a whole. With the catheter held in fixed relation to the stylet, the two are now withdrawn together.

The stylet 8 for insertion of the catheter in a male may be curved at its tip, just as urethral sounds are curved for ease of introduction in the male, and the tube, being flexible conforms to the curvature of the stylet. This is not necessary in the female.

Somewhat modified forms of the catheter are shown in FIGURES 9 to 12. In the form already described reliance is placed on applied resiliently elastic elements 6 to urge the wings 4 into their retaining position. These elements 6 may be eliminated, and some cost may be saved by reason thereof, if the tube 1, or at least its wings 4, be made of a material such as a plastic that can be resiliently biased to fold inherently into retaining position. Such inherently biased wings are distinguished by the numeral 4′. These wings 4′ will inherently tend to assume the position shown in FIGURES 10, 11 and 12, but are pushed into the inserting or withdrawing position of FIGURE 9 by insertion and pressure distally of the stylet 8, while pulling upon the proximal end of the tube. Additionally, and optionally, the wings may be shrouded by a hood 9 of very thin rubber or the like, faired into the external surface of the tube 1 beyond the ends of the single or double series of wings 4 or 4′. The use of such a hood tends to spread further the bearing of the wings on the bladder wall, and eliminates the bearing, however slight it may be, of the edges of the slits 5a or 5b that define the wings, upon the tissues surrounding the entrance to the urethra. The hood yields readily to enable outward spreading of the wings upon placement of the catheter. It will as readily contract radially to the inserting position of FIGURE 9. The hood is useful either with the form of FIGURES 1 to 8 or with the form of FIGURES 9 to 12.

These and other aspects of the invention will be evident to those skilled in the art based on the foregoing disclosure of the preferred embodiment thereof.

What is claimed is:

1. A catheter comprising a tube occluded at its distal end but open at its proximal end, and formed with at least one aperture through its wall adjacent its distal end, said tube having a plurality of generally longitudinal slits distributed about a circumferential zone adjacent but proximally of said aperture, to define a plurality of wing elements that are foldable outwardly to define radially directed flange-forming wings, said wing elements being subject to elastic forces that tend to draw together their proximal and distal ends and so to fold them, intermediate such ends, outwardly into retaining flange-forming position, resiliently elastic means separate from said wings attached to said tube for applying said elastic forces to said wings, said catheter being adapted for insertion of a stylet through its open proximal end to engage its occluded distal end, whereby to extend longitudinally and to draw radially inwardly the wing elements, into alignment with the distal end of the tube, in opposition to the elastic forces, for insertion and removal of the catheter.

2. A catheter as in claim 1, wherein said resiliently elastic means spans the wing elements longitudinally, and reacts between their distal and proximal ends, to draw such ends together.

3. A catheter as in claim 2, wherein the resiliently elastic means are located at the interior wall of the catheter.

4. A catheter as in claim 3, wherein the wing elements are longitudinally channeled along their inner surface for accommodative reception of a resiliently elastic means in each such channel with the wing elements retracted.

5. A catheter as in claim 2, wherein the resilient means consist of a stretchable rubber element, at least one for each wing element, anchored at its ends in the wall of the catheter proximally and distally beyond the bases of the wing elements, each rubber element being disposed along the interior wall of its wing element, and each wing element being formed with a longitudinal channel for reception of said rubber element when the catheter is extended by the stylet.

6. A catheter as in claim 1, including a hood of flexible material shrouding the exterior of the wing elements.

7. A catheter as in claim 1, wherein the wall of the catheter is of flexible material slitted longitudinally along a plurality of lines in a common zone to define the wings.

8. A catheter as in claim 7, wherein the slits are arranged similarly in each of two adjoining zones, but are staggered circumferentially relative to one another in the respective zones.

9. A catheter as in claim 8, wherein the slits define four wings in each of two zones, which when out-folded are generally coplanar, but staggered angularly.

10. A catheter comprising a tube occluded at its distal end, and formed with a lateral aperture at such distal end, for passage from the exterior into the interior of the tube, or vice versa, said tube having a plurality of longitudinal slits in a zone adjacent but proximally of said aperture, to define a plurality of foldable wings, and resiliently stretchable means separate from said wings reacting between the distal and proximal ends of the tube, spanning said wings, to draw the proximal ends thereof towards the distal end and so to expand the wings after insertion of the catheter.

References Cited

UNITED STATES PATENTS

| 504,424 | 9/1893 | Pezzer | 128—349 |
| 1,719,428 | 7/1929 | Friedman | 128—242 |
| 1,863,057 | 6/1932 | Innes | 128—243 |
| 1,870,942 | 8/1932 | Beatty | 128—241 |
| 2,616,429 | 11/1952 | Merenlender | 128—350 |
| 2,649,092 | 8/1953 | Wallace | 128—349 |
| 3,108,595 | 10/1963 | Overment | 128—350 |

OTHER REFERENCES

A.C.M.I. Catalogue (1960), pp. 14, 15, 19, 35, relied on.

DALTON L. TRULUCK, *Primary Examiner.*